(12) United States Patent
Olsson

(10) Patent No.: US 12,415,337 B2
(45) Date of Patent: Sep. 16, 2025

(54) LAMINATED FILM WITH STRETCHED LAYER

(71) Applicant: LAMIFLEX AB, Nyköping (SE)

(72) Inventor: Kristoffer Olsson, Nyköping (SE)

(73) Assignee: LAMIFLEX AB, Nyköping (SE)

( * ) Notice: Subject to any disclaimer, the term of this patent is extended or adjusted under 35 U.S.C. 154(b) by 258 days.

(21) Appl. No.: 17/592,609

(22) Filed: Feb. 4, 2022

(65) Prior Publication Data

US 2022/0152978 A1    May 19, 2022

Related U.S. Application Data

(63) Continuation of application No. 15/907,341, filed on Feb. 28, 2018, now abandoned, which is a continuation of application No. PCT/SE2016/050827, filed on Sep. 2, 2016.

(30) Foreign Application Priority Data

Sep. 4, 2015  (SE) .................................... 1551134-8

(51) Int. Cl.
| | |
|---|---|
| *B32B 7/022* | (2019.01) |
| *B32B 5/02* | (2006.01) |
| *B32B 7/12* | (2006.01) |
| *B32B 27/08* | (2006.01) |
| *B32B 27/12* | (2006.01) |
| *B32B 27/32* | (2006.01) |
| *B32B 38/00* | (2006.01) |
| *B65D 65/02* | (2006.01) |
| *B65D 65/40* | (2006.01) |
| *B65D 85/04* | (2006.01) |

(52) U.S. Cl.
CPC .............. *B32B 7/022* (2019.01); *B32B 5/024* (2013.01); *B32B 7/12* (2013.01); *B32B 27/08* (2013.01); *B32B 27/12* (2013.01); *B32B 27/32* (2013.01); *B32B 38/0012* (2013.01); *B65D 65/02* (2013.01); *B65D 65/40* (2013.01); *B65D 85/04* (2013.01); *B32B 2038/0028* (2013.01); *B32B 2250/03* (2013.01); *B32B 2250/242* (2013.01); *B32B 2250/40* (2013.01); *B32B 2262/0253* (2013.01); *B32B 2307/516* (2013.01); *B32B 2307/554* (2013.01); *B32B 2307/712* (2013.01); *B32B 2553/00* (2013.01)

(58) Field of Classification Search
CPC ................ B32B 7/022; B32B 38/0012; B32B 2038/0028; B32B 2307/516; B32B 7/035; B65D 65/02; B65D 65/40; B65D 85/04

See application file for complete search history.

(56) References Cited

U.S. PATENT DOCUMENTS

| | | | | |
|---|---|---|---|---|
| 4,331,725 | A * | 5/1982 | Akao ..................... | B32B 27/32 428/317.5 |
| 2005/0123720 | A1* | 6/2005 | Suzuki ................... | B32B 37/04 428/137 |
| 2009/0191779 | A1* | 7/2009 | Cree ..................... | B29C 66/21 442/361 |
| 2009/0317650 | A1* | 12/2009 | Yang ..................... | B32B 7/035 428/523 |

* cited by examiner

*Primary Examiner* — Jenna N Chandhok
(74) *Attorney, Agent, or Firm* — Reising Ethington P.C.

(57) ABSTRACT

A film for the wrapping of objects comprising a first film layer made from an elastic material, a second film layer made from a sturdy material, and a third layer made from an elastic material, wherein the first and third film layers are stretched.

8 Claims, 6 Drawing Sheets

LAMINATED FILM WITH STRETCHED LAYER

REFERENCE TO RELATED APPLICATIONS

This application is a continuation of U.S. patent application Ser. No. 15/907,341 filed Feb. 28, 2018 which is a continuation of PCT/SE2016/050827 filed on Sep. 2, 2016, and claims the benefit of Swedish Application No. SE1551134-8 filed on Sep. 4, 2015. The entire contents of these priority applications are incorporated herein by reference in their entireties.

TECHNICAL FIELD

The present invention relates generally to a film for the wrapping of objects, particularly for wrapping steel coils.

BACKGROUND ART

In prior art it is known to use various kinds of films to wrap objects of various kinds. Depending on the intended application area, there are different restrictions and requirements placed on the films that are to be used. Laminated films comprising polymeric tapes are known, such as those disclosed in EP2799237.

However, there are still problems with known solutions, for instance it could be beneficial in some application areas to achieve a film that provides a tighter sealing around an object, such as for the application area of wrapping steel coils.

It would be desirable if a film could be achieved which provides a good mechanical protection and is durable, while still wrapping tightly around the object around which it is wrapped.

SUMMARY OF INVENTION

An object of the present invention is to overcome at least some of the problems outlined above.

According to a first aspect, a film for the wrapping of objects is provided, particularly for steel coils. The film comprises a first film layer made from an elastic material, a second film layer made from a durable material, and a third layer also made from an elastic material. The first and third film layers are stretched in a longitudinal direction, and the second layer is disposed between the first film layer and the third film layer. By having such a film with one un-stretched layer with a durable material and two elastic layers that are stretched, a film is achieved that provides a good protection, while still wrapping very tightly to the object around which it is wrapped, due to the stretched material striving to go back to its un-stretched state.

According to a second aspect, a system for manufacturing a film for the wrapping of objects is provided. The system comprises a first roller running at a first speed positioned at a first position and a second roller running at a second speed positioned at the first position, the second speed being higher than the first speed. The system further comprises a third roller running at the first speed, positioned at the first position, wherein the second roller is disposed between the first and the third roller. The system further comprises laminating rollers positioned at a second position, the second position being downstream of the first position. The first roller is adapted to feed a first layer film comprising an elastic material, the second roller is adapted to feed a second film layer comprising a sturdy material, and the third roller is adapted to feed a third layer film comprising an elastic material, and the laminating rollers are adapted to laminate the three layers into a film comprising three layers. According to an optional embodiment, the elastic layers are stretched in the feeding direction of the system.

According to a third aspect, there is provided a method for manufacturing a film for the wrapping of objects, comprising the steps of providing and stretching a first film layer comprising an elastic material, providing a second film layer comprising a sturdy material, and providing and stretching a third film layer comprising an elastic material, wherein the second film layer is provided between the first film layer and the third film layer. The method further comprises laminating the layers together to form a laminated film. According to an optional embodiment, the stretching is performed in the longitudinal direction of the film.

By using a film, system or method as disclosed herein, it is possible to achieve a film for the wrapping of objects that provides a good protection, both mechanically and against external factors such as air and moisture, while still wrapping very tightly around the object to be wrapped.

BRIEF DESCRIPTION OF DRAWINGS

The invention is now described, by way of example, with reference to the accompanying drawings, in which.

DESCRIPTION OF EMBODIMENTS

In the following, a detailed description of the different embodiments of the solution is disclosed with reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function of the implementation.

Briefly described, the solution relates to a film for the wrapping of objects, as well as a system and method for the wrapping of objects. The solution is primarily intended to be used for wrapping steel coils and other similar materials, but it should be understood that the solution may be applicable to other types of materials as well.

The solution is intended to achieve a film that protects the wrapped object from external forces, such as moisture, air and scraping, and that tightly wraps around the object it is intended to protect.

Figure 1:
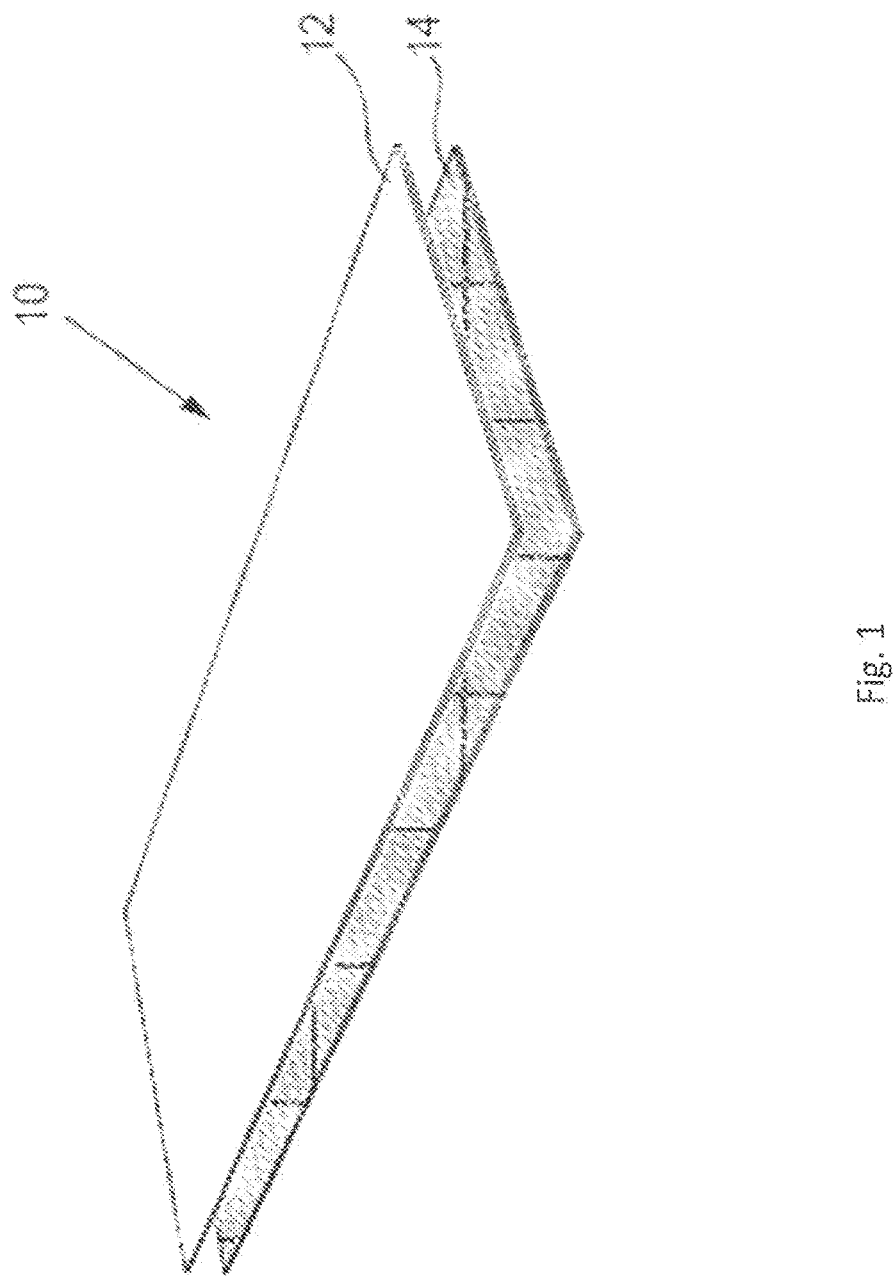
FIG. 1 shows a sectional view of a first embodiment of a film according to the present disclosure.

This is achieved by having a film comprising at least three layers, wherein one layer is stretched (or pre-stretched) while the other two layers are not. By stretching one layer and not the other, it is possible to use more rigid, sturdy and durable materials for the protective layer that provide a better mechanical protection and reinforcing properties than materials that are adapted for being stretched. Further, by stretching one of the layers, it is possible to achieve a film that strives to go back to un-stretched state, which makes the film wrap more tightly around the object it is intended to protect. This disclosure also relates to a system and method for manufacturing such a film as well. The solution will now be described in further detail with reference to the accompanying drawings. FIG. 1 shows a film 10 according to the present disclosure comprising two layers, a first layer 12 and a second layer 14. The first layers 12 is stretched, such that it strives to go back to its original un-stretched state. This entails that the film will wrap more tightly around an object than if no layers were stretched. Meanwhile, the second layer 14 is not stretched, which entails that a sturdier and more rigid material may be used, which provides better mechanical protection than materials that are adapted to be stretched.

The first layer 12 typically comprises an elastomer, such a low density polyethylene. The material of the first layer 12 is intended to be flexible while still providing a good protection against external factors, such as e.g. moisture in the air. As mentioned, the first layer 12 of the film is stretched. Typically this is done during the manufacturing of the film, which will be described in more detail later in this disclosure. The film is typically only stretched in one direction, which is the same direction as the film is being fed during manufacture, which in a completed film would be seen as the longitudinal direction.

The second layer 14 typically comprises a woven plastic material. The second layer 14 is intended to provide mechanical protection, and therefore it is sturdier, stronger and more rigid than the first layer 12. Also, unlike the first layer 12, the second layer 14 is not stretched, which enables the previously mentioned use of a material that is sturdier, stronger and more rigid.

The second layer may in some embodiments be made of polypropylene. In other embodiments, the second layer may be made from polyethylene, both high density and low density, that has been pre-stretched, which results in it being much less elastic, more durable and provides a better mechanical protection than polyethylene that has not been pre-stretched. In embodiments wherein the second layer comprises polypropylene, the polypropylene may also be pre-stretched.

The first layer 12 and the middle layer 14 are laminated together to form one film comprising two layers. Such a film will have the mechanical protection provided by the second layer 14, comprising a sturdy and durable material, while still wrapping very tightly around the object to be wrapped due to the first layer 12 being stretched, which makes it strive to go back to its un-stretched state. The sturdy material may for instance be a woven plastic material. The elastic material is typically an elastomer, such as low density polyethylene. It should be understood that the examples used herein are not to be limiting, it is possible to use other materials that have similar properties as the examples above.

The film according to the present disclosure is typically intended for the wrapping of steel coils. Steel coils have very sharp edges, and the weight entails that the contact pressure is very high when they are lifted, which requires a film that is both durable and flexible, which may be achieved as disclosed herein.

Figure 2:
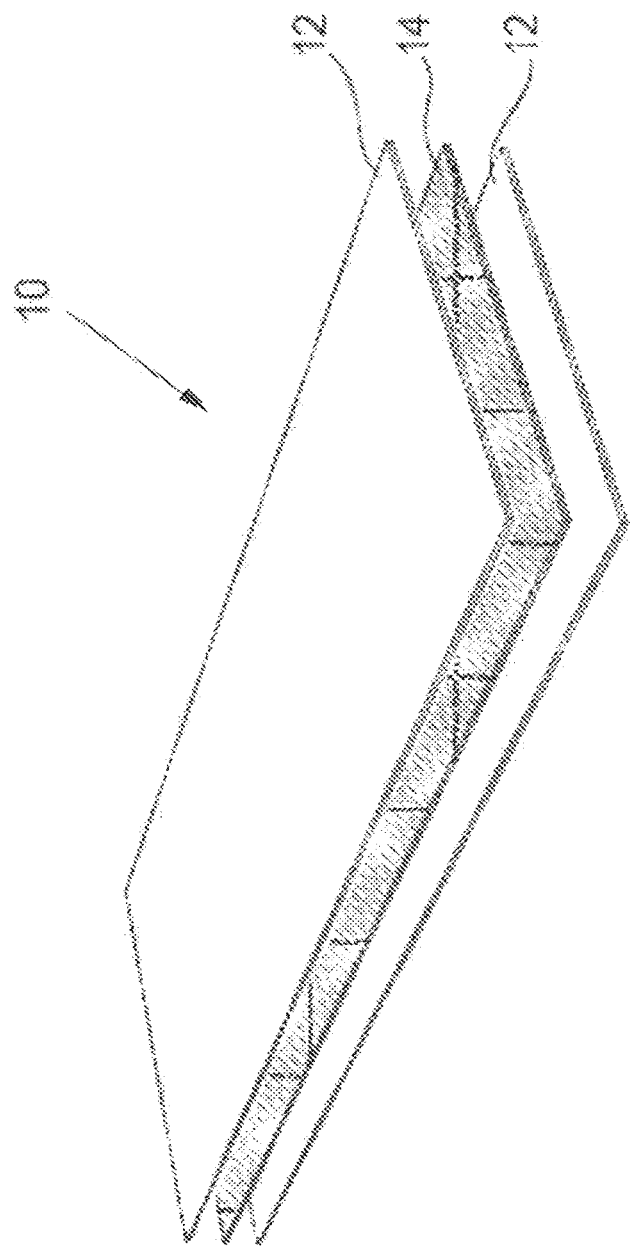
FIG. 2 shows a sectional view of a second embodiment of a film according to the present disclosure.

In some embodiments, the film 10 comprises three layers instead of two. This is shown in FIG. 2. In this embodiment, the film comprises two outer layers 12 made from an elastic material, and a middle layer 14 made from a sturdy material. By using one elastic layer on each side of the sturdy layer, the advantageous properties of the film are further enhanced, such that it gives a better protection and wraps tighter around the objects intended to be wrapped.

Figure 3:
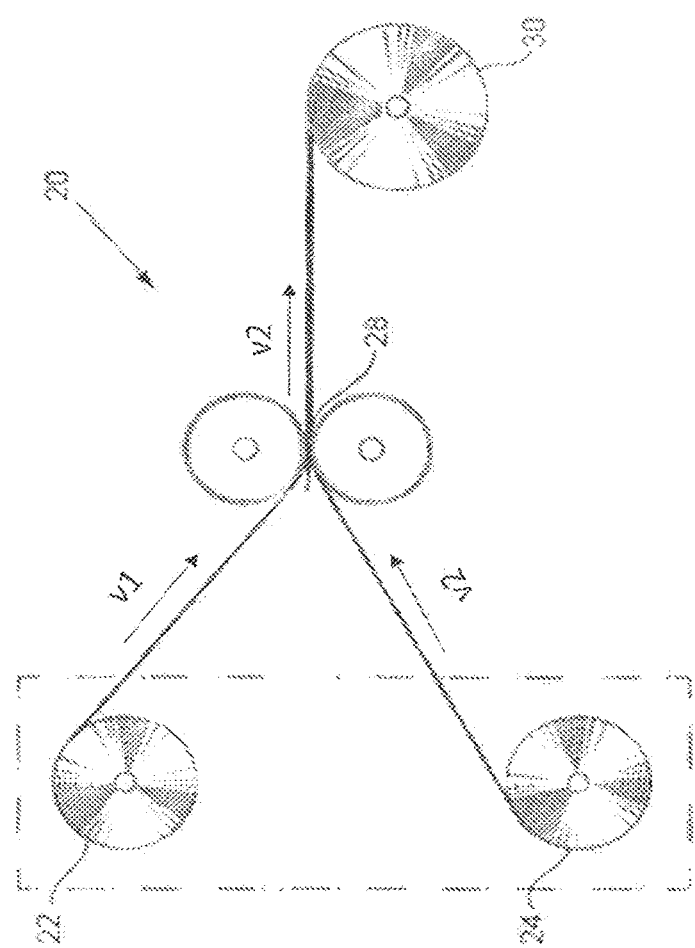
FIG. 3 shows a schematic view of a first embodiment of a system according to the present disclosure.

Looking now at FIG. 3, a system for manufacturing a film will now be described. FIG. 3 shows a system 20 comprising a first roller 22 and a second roller 24. The first 22 and second 24 rollers are positioned at a first position in the production cycle, which is upstream from a second position where laminating rollers 28 are positioned. The laminating rollers 28 are adapted to laminate the layers of film together into one film comprising two or more layers. This may be done e.g. through pressing the materials together extremely tightly, using adhesive agents and/or heat, and other similar laminating technologies aimed at joining multiple layers of materials together.

The first roller 22 is adapted to feed a first film layer comprising an elastic material, and the second roller 24 is adapted to feed a second film layer comprising a sturdy material. The first roller 22 is adapted to run at a speed v1. The second roller 24 is adapted to run at a speed higher than that of the first roller 22, shown as v2. The laminating rollers 28 are also adapted to run at the second speed v2.

The speed with which the materials are fed towards the laminating rollers 28 is constant for each material, even though the speed of individual rollers may differ. The speed with which the films is fed by the laminating rollers 28 is also constant. Depending on the exact structure of the system, this may entail slight variations in how rollers are configured. If the rollers comprise a stack of material which is wound around an axis and the unwound as the material is fed, the rotational speed of the roller would have to continuously increase slightly to maintain a constant feeding speed, as the diameter of the wound material decreases due to the material being fed towards the laminating rollers 28.

Due to the speed of the rollers differing, the first layer of the film will be stretched but second layer will not be. Since the first roller 22 feeds its material towards the laminating rollers 28 at a first speed v1, while the laminating rollers 28 feeds the film in the feeding direction at a second speed v2, wherein v2 is higher than v1, the elastic material will be stretched. This is due to the difference in speeds that occurs at the second position, i.e. at the laminating rollers 28. Since the feeding speed of the laminating rollers 28 is higher than the feeding speed of the first roller 22, the material will be stretched at the second position. As for the second roller 24, the sturdy material being fed by the second roller 24 is not stretched, since the feeding speed of the second roller 24 is the same as the feeding speed of the laminating rollers 28, i.e. v2.

The second roller 24, however, operates at the same speed as the laminating rollers 28, which ensures that the sturdy layer of the film, which is the one fed by the second roller 24, is not stretched during the manufacturing process. Typically, the system is adapted such that the elastic material is stretched by an additional 10-50% as compared to its original state, but in some embodiments it may be higher, such as up to 300%. Optionally, the system 20 may also comprise a coil 30 onto which the film may be wound.

Figure 4:
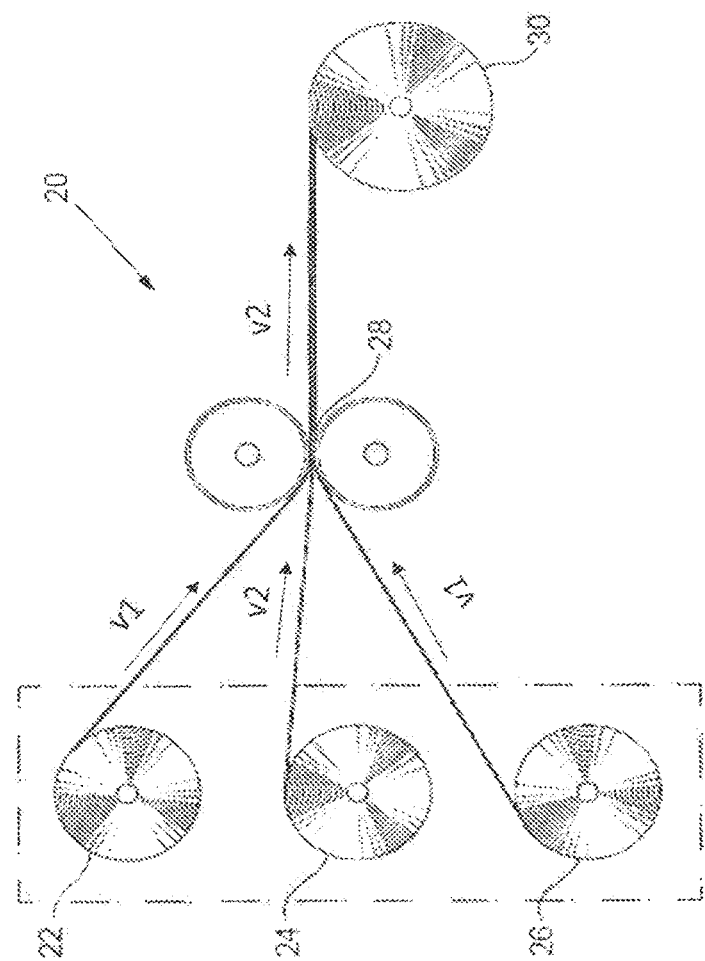
FIG. 4 shows a schematic view of a second embodiment of a system according to the present disclosure.

In some embodiments, the system 20 comprises three rollers instead of two. This is shown in FIG. 4. In this embodiment, the system further comprises a third roller 26. Typically, the third roller 26 is positioned such that the second roller 24 is disposed between the first roller 22 and the third roller 26. The third roller 26 is, like the first roller 22, adapted to feed a film layer comprising an elastic material. The third roller 26 runs at a speed v1, same as the first roller 22, which results in that the film layer fed by the third roller 26 is being stretched in the same way that the film layer fed by the first roller 22 is. This results in a film comprising three layers, wherein the two outer layers are stretched and comprise an elastic material, while the middle layer comprises a sturdy material. The layers that are stretched are typically stretched in the same direction as the film is being fed, which is the longitudinal direction of the resulting film.

Figure 5:
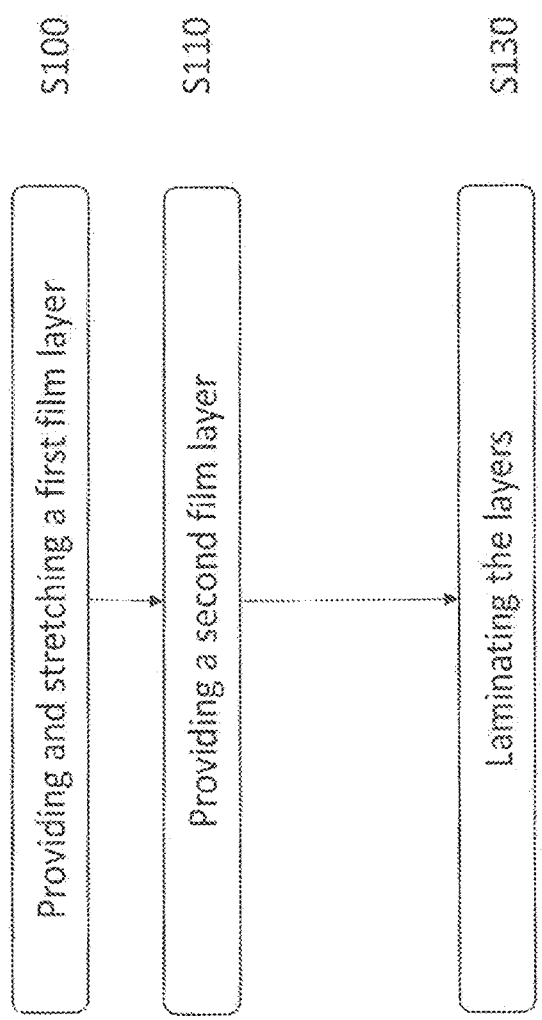
FIG. 5 shows the steps of a first embodiment of a method according to the present disclosure.

Looking now at FIG. 5, the method according to the present disclosure will be described. The first step S100 comprises providing and stretching a first film layer, typically comprising an elastomeric material such as low density polyethylene. By stretching the material, it strives to go back to its un-stretched state, which results in the material wrapping very tightly around the object around which it is wrapped.

The second step S110 comprises providing a second film layer, the second film layer comprising a sturdy material such as woven plastic material.

The final step S130 of the method comprises laminating the layers together to form one film comprising two layers, wherein the first layers is stretched and the second layer is not.

Figure 6:
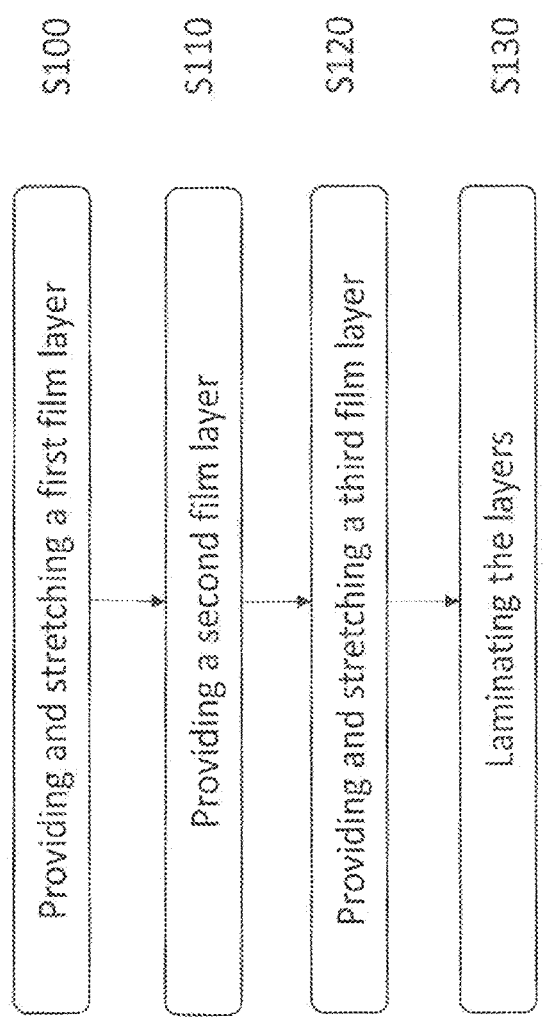
FIG. 6 shows the steps of a second embodiment of a method according to the present disclosure.

In some embodiments, the method further comprises a step S120 of providing and stretching a third film layer, the third film layer also comprising an elastic material. This step may be seen in FIG. 6. In this embodiment, the second film layer is typically provided between the first film layer and the third film layer, and the step of laminating the layers comprises laminating three layers instead of two.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more".

The invention claimed is:

1. A film for wrapping of objects, comprising:
   a first film layer made from a first elastic material,
   a second film layer that comprises a woven plastic material and is not stretched, or wherein the second film layer is pre-stretched and made of polypropylene or high density or low density polyethylene;
   a third film layer made from a second elastic material,
   wherein the second film layer is disposed between the first film layer and the third film layer, and the first film layer and the third film layer are stretched only in a longitudinal direction, with respect to a direction the film for wrapping of objects is being fed during manufacture, wherein the first and third film layers are stretched during manufacture of the film for wrapping of objects such that they strive to go back to an un-stretched state, wherein the first and third film layers are stretched by 10%-50%, wherein the first, second and third film layers are laminated together when the first and third film layers are being stretched by 10%-50%.

2. The film according to claim 1, wherein the second film layer is made from a woven plastic material.

3. The film according to claim 1, wherein the first and third film layers are made from low density polyethylene.

4. A system for manufacturing a film for wrapping of objects, comprising:
   a first roller running at a first speed positioned at a first position, the first roller adapted to feed a first film layer comprising an elastic material;
   a second roller running at a second speed positioned at the first position, the second speed being higher than the first speed, the second roller adapted to feed a second film layer configured to provide mechanical protection,
   laminating rollers positioned at a second position, the second position being downstream of the first position;
   wherein the first position being any position upstream of the second position, wherein,
   the system further comprises a third roller running at the first speed, positioned at the first position, the third roller adapted to feed a third film layer comprising an elastic material;
   the second roller is disposed between the first and the third roller, wherein the first and third film layers are stretched during manufacture of the film for wrapping of objects; and
   the laminating rollers are adapted to laminate the three film layers into a film comprising three layers, wherein the first, second and third layers are laminated together when the first and third film layers are being stretched by 10%-50% and wherein the second film layer is made from a woven plastic material and is not stretched, or wherein the second film layer is pre-stretched and made of polypropylene or high density or low density polyethylene.

5. A method for manufacturing a film for wrapping of objects comprising the steps of:
   providing a first film layer comprising an elastic material;
   providing a second film layer that comprises a woven plastic material and is not stretched, or wherein the second film layer is pre-stretched and made of polypropylene or high density or low density polyethylene;
   providing a third film layer comprising an elastic material, wherein the second film layer is provided between the first film layer and the third film layer,
   laminating the film layers together to form a laminated film,
   wherein the first and third film layers are stretched during manufacture of the film for wrapping of objects such that they strive to go back to an unstretched state, wherein the first and third film layers are stretched by 10%-50%, wherein the first, second and third film layers are laminated together when the first and third film layers are being stretched by 10%-50%
   wherein the stretching is performed only in the longitudinal direction of the film, with respect to a direction the film is being fed during manufacture.

6. The method according to claim 5, wherein the first and third film layers are stretched by 10%-25%, wherein the first, second and third film layers are laminated together when the first and third film layers are being stretched by 10%-25%.

7. The film according to claim 1, wherein the first and third film layers are stretched by 10%-25%, wherein the first, second and third film layers are laminated together when the first and third film layers are being stretched by 10%-25%.

8. The system according to claim 4, wherein the first and third film layers are stretched by 10%-25%, wherein the first, second and third film layers are laminated together when the first and third film layers are being stretched by 10%-25%.

* * * * *